March 9, 1954  A. A. COSTER  2,671,612
MOVING TARGET GENERATING DEVICE
Filed Feb. 5, 1953  2 Sheets-Sheet 1

INVENTOR.
ALLAN A. COSTER
By: Erwin B. Steinberg
AGENT

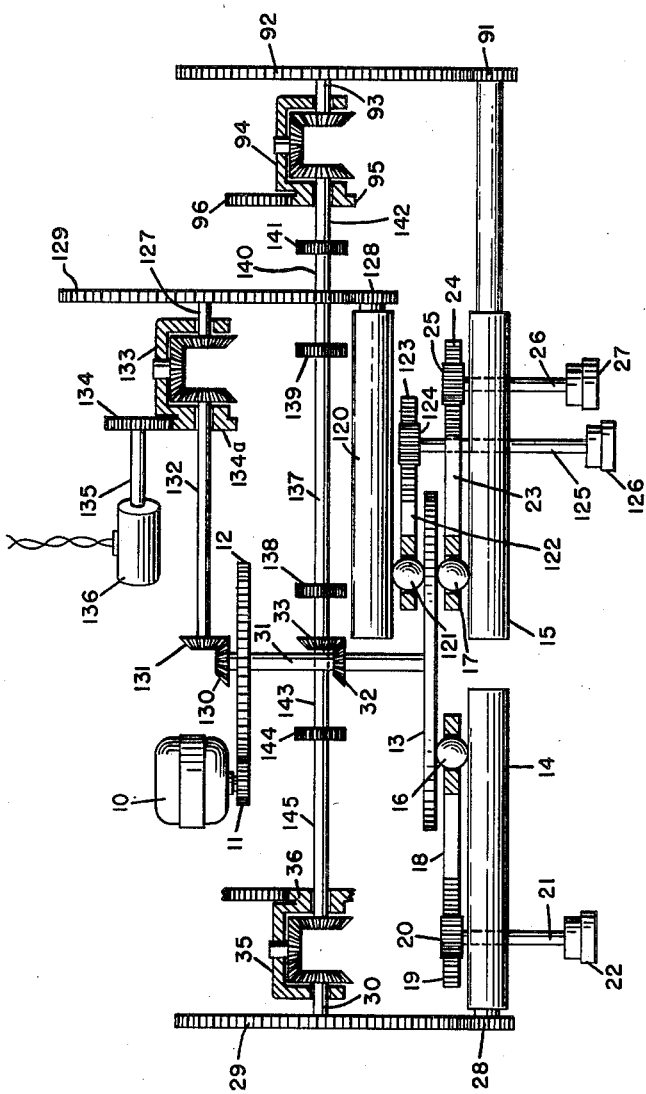

Patented Mar. 9, 1954

2,671,612

UNITED STATES PATENT OFFICE 2,671,612

MOVING TARGET GENERATING DEVICE

Allan A. Coster, Lewisboro, N. Y., assignor to The Reflectone Corporation, Stamford, Conn., a corporation of Connecticut Application February 5, 1953, Serial No. 335,270

6 Claims. (Cl. 235—61.5)

This application is a continuation (as to all common subject matter) of my copending application, Serial No. 257,609, filed November 21, 1951, for improvements in Moving Target Generating Device, now abandoned.

This invention relates to mechanical analog computing devices and synthetic target simulating equipment and has particular reference to target course generators which generate and simulate the motion of a target by providing shaft rotations which represent the components of the instantaneous location of the target.

The motion of an aircraft, ship or other movable object is identified by the characteristics of speed and course. Graphically, these characteristics can be represented by a vector the length of which represents the speed, and the orientation of which with respect to a rectilinear coordinate system represents the course of the moving target. Often it is desired to gradually alter the course of the target in which case a rate of turn motion must be impressed upon the course characteristics. In its mechanical embodiment such a target generator comprises a constant speed drive, differential means, and several variable drive devices usually of the disk-ball-roller or disk-wheel construction such as are well known in the art. A constant speed drive, for instance, is connected to the rotating input disk of a primary variable drive device. The adjustable output speed of this variable drive device represents the speed vector $ds/dt$. This output speed is applied further to a secondary variable drive device of similar construction which has attached thereto adjustable control means for resolving circular input motion into two mutually normal vectors representing the sine and cosine functions of the input. The two resultant rate vectors thus obtained, may be connected to differential means for combining each resultant output vector with the constant input speed thereby obtaining course components with proper quadrant notation. In order to impose upon the resultant course vectors a rate of turn motion, a tertiary variable drive device is connected to the constant speed drive. The output of this tertiary variable drive device, by means of suitable gears, is connected to the controllable resolving means attached to the secondary variable drive device thereby superimposing a rate of turn motion on to the resultant vectors of course motion.

In target course generators of the foregoing type it is desirable that the speed range can be terminated at the precise zero point. When using the disk-ball-roller type variable speed device, this zero position is possible only in a theoretical manner because as the motion transmitting balls are brought into the center of the rotating input speed disk, a very severe scuffing action of the balls takes place rendering the balls defective and unsuitable for continuing use. In fact in many designs provisions are made to prevent the balls from traversing through the center of the disk. This lack of a zero setting on the other hand, causes the target course generator to have an initial "hop-off" speed which is a definite amount above the zero point. Furthermore, in the prior art it has been necessary to generate the rate of turn motion by means of a separate and space consuming driving mechanism incorporating a tertiary variable speed device and complicated transmission means.

One of the objectives of the invention is to provide an improved target course generator of little weight and small dimensions which avoids one or more of the disadvantages and limitations of prior art arrangement.

Another objective of the invention is the provision of a stepless variable speed characteristics adjustable between zero speed and a predetermined value.

A further important objective of the invention is the elimination of a separate variable drive device for generating the rate of turn motion, thereby achieving considerable economy, simplicity of operation and ease of installation.

Still another object of the invention is the provision of a single target course generator which incorporates target motion along two interdependent axes and along one independent axis.

In general, the invention provides a moving target generating device in which a primary variable drive device, driven from a constant speed drive, generates a first rotational motion proportional to the speed of the moving target and a second rotational motion proportional to the rate of turn of the target. A first differential means is connected to the primary variable drive device for rendering the motion proportional to the speed of the target to be adjustable between zero and a predetermined value. The input of a secondary variable drive device is connected to the first differential means and the circular motion received by this second variable device is resolved into two mutually normal vector movements of course by virtue of the resolving means attached thereto. A second differential means connected to the primary variable drive device renders the motion proportional to the rate of turn of the target to be adjustable from a zero setting in a forward and a reverse direction. The output of this second differential means is connected to the secondary variable drive device for influencing the setting of the resolving means attached thereon, thereby superimposing a rate of turn motion on to the vector movements of course.

With the above and other objects in view, this invention consists of such construction and arrangement of parts as will be more fully described hereinafter in connection with the accompanying drawings, in which:

Figure 3 is a diagrammatic sketch of the apparatus modified for obtaining target motion also along a third axis.

Figure 1:
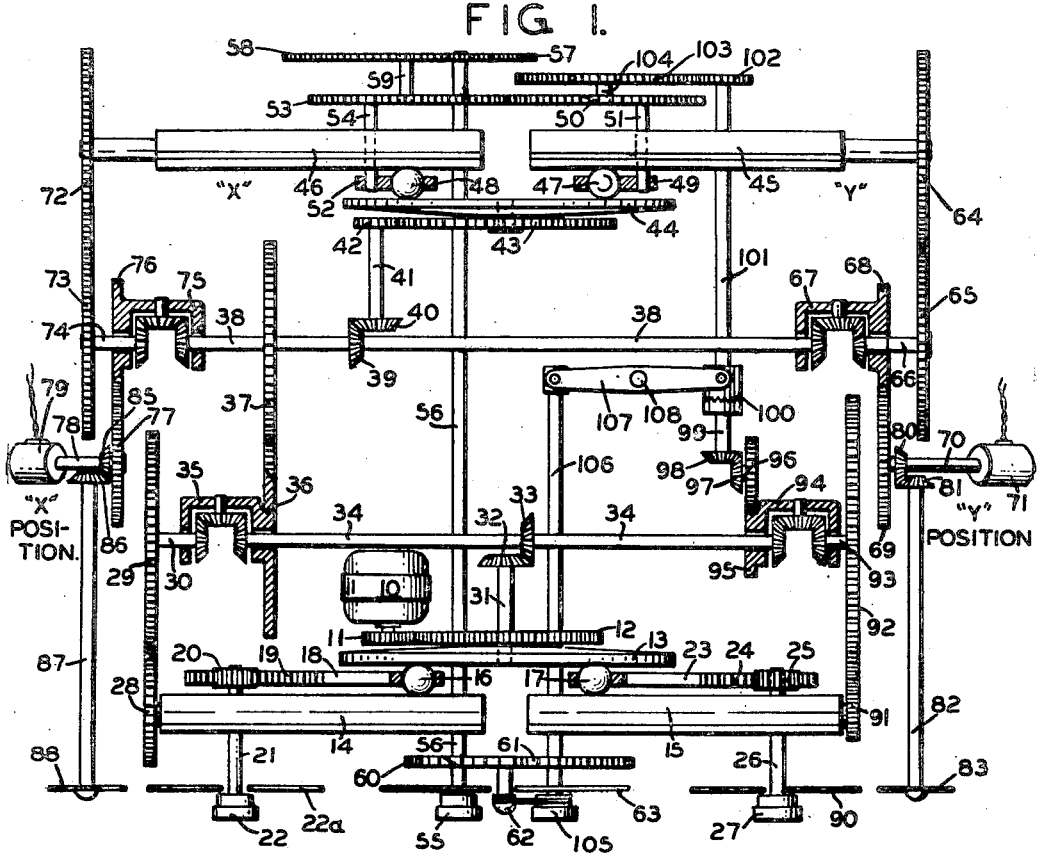
Figure 1 is a diagrammatic sketch of the apparatus for obtaining the desired motion along two perpendicular axes.
Figure 2:
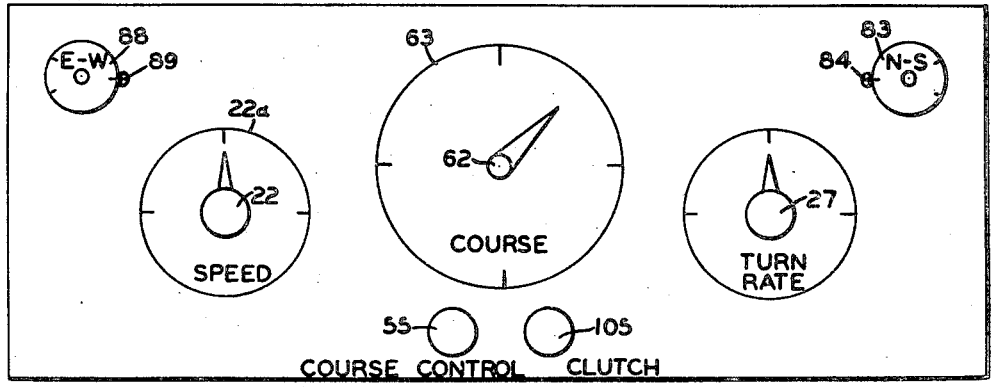
Figure 2 is a diagrammatic sketch showing the indicators and dials together with dials and knobs for setting the controls.

Referring to Figures 1 and 2 a constant speed motor 10 is the driving power of the entire apparatus. It drives through a set of reduction gears, gear 11 attached to the motor and gear 12 mounted on shaft 31, a primary variable drive device comprising an input member, rotating disk 13 also mounted on shaft 31, two output members in the form of rollers, roller 14 and roller 15 respectively, coupling ball 16 associated with roller 14 and coupling ball 17 associated with roller 15. Ball 16 in frictional driving cooperation with the disk 13 and with roller 14 is accommodated in a hole in rod 18. By means of gear rack 19 attached to rod 18 and engaging pinion 20 with shaft 21 and knob 22 fast thereon, ball 16 may be located at different radial positions of the disk 13 thereby obtaining various output speeds of roller 14. In a similar manner ball 17 is retained in a hole of rod 23 and is positioned along the radial axis of disk 13 by means of rack 24, pinion 25, shaft 26 and knob 27. Neither ball 16 nor ball 17 traverses through the center of rotation of disk 13. Both balls are adjustably positioned between a point slightly removed from the center of the disk 13 and a point near the periphery of disk 13.

Roller 14 by means of suitable gearing, gear 28 and gear 29 respectively, is connected to the input shaft 30 of a first differential means. Rotating disk 13 by means of shaft 31, miter gear 32 fast thereon and matching miter gear 33 attached to cross shaft 34, is connected to a second input of the first differential means. The cage 35 constituting the output member of this first differential means is connected to gear 36 in engagement with gear 37. The rotational speed of gear 36 attached to the output member 35 of the first differential means may be considered the speed vector proportional to the speed of a moving target. Assuming that ball 16 is located at a point near the center of disk 13 in such a manner that the roller 14 performs two revolutions for each single revolution of disk 13 and shaft 31 attached thereto, and that gear 28 in combination with gear 29 has a step-down ratio of 2:1, then shaft 30 and cross shaft 34 connected to the inputs of the first differential means rotate at equal speed but in opposite direction thereby causing zero rotation of cage 35 and gear 36 attached thereto. In this manner a precise point of zero speed is obtained for the speed setting which is manually adjusted by knob 22 used in combination with calibrated dial 22a. By radially displacing the ball 16 toward the periphery of disk 13, the speed of roller 14 and the speed of differential cage 35 influenced thereby, is increased. Having thus produced the motion which is proportional to the speed vector of a moving target and which is adjustable from zero to a predetermined value, the next step is to resolve the speed vector into two course components, X- and Y-vector components, at right angle to one another.

Gear 37 engaging gear 36 is mounted on cross shaft 38 which has attached thereon miter gear 39. A matching miter gear 40 in contact with gear 39, by means of shaft 41, gear 42 and gear 43 transmits rotational motion to the disk 44, which constitutes the input member of a secondary variable drive device. The secondary variable drive device, in a similar manner as the primary variable drive device, comprises two output members, roller 45 and roller 46 respectively, ball 47 in frictional driving engagement with disk 44 and roller 45, and ball 48 in frictional driving engagement with disk 44 and roller 46. Ball 47 is accommodated in an aperture of bar 49 which is slidably positionable along the radial axis of disk 44 by gear 50 and connecting pin 51 extending therefrom. In a similar manner ball 48 is accommodated in an aperture of bar 52 which is slidably positionable along the radial axis of the disk 44 by gear 53 and connecting pin 54.

Matching gears 50 and 53 together with pins 51 and 54, comprise a so-called "Scotch yoke" mechanism by virtue of pin 51 being located in the radial surface of gear 50 at 90 degrees displaced with respect to the radial location of pin 54 in gear 53. Consequently, when rotating gear 53, ball 48 and ball 47 assume differing radial positions along the face of disk 44 which are 90 degrees out of phase and represent a sine-cosine function. The input rotary motion to the secondary variable drive device representing the vector of the speed of the target is thereby resolved into the proper X-vector course component manifesting itself as the rotation of roller 46 and into the proper Y-vector course component manifesting itself as the rotation of roller 45. Both output rotations represent the N-S and E-W components of the instantaneous location of the target simulated.

The "Scotch yoke" mechanism is manually controllable and adjustable by means of rotatable knob 55 attached to shaft 56 and gear 57 mounted thereon which engages gear 58 and transmits motion to gear 53 of the "Scotch yoke" mechanism via shaft 59. For the purpose of providing visual indicating means of the course setting, shaft 56 has attached thereon gear 60 which engages a matching gear 61 to operate a rotatable pointer 62 mounted in front of a calibrated course dial 63.

In order that zero output of the respective course components is obtainable without shifting the corresponding ball to the center of the rotating disk and, furthermore, in order that the course motion may extend into all four quadrants without change of the rotational direction of roller 45 and roller 46 respectively, differential means are attached to either roller wherein the input motion of rotating disk 44 is subtracted from the output speed of the roller. Roller 45 by means of a matching set of gears, gear 64 and gear 65 respectively, is connected to one input shaft 66 of a second differential means. Cross shaft 38 by means of miter gears 39 and 40, shaft 41, gears 42 and 43 transmits the rotational speed of disk 44 to the other input side of the second differential means. Cage 67 being the output member of this second differential means, connected to gear 68 and engaging matching gear 69, transmits its rotation to shaft 70 which is connected to an electrical transmitting device 71 for converting mechanical rotation into electrical signals. Assuming that ball 47 is located at the center of its excursion path along the radial axis of disk 44 and that at this particular location roller 45 revolves at six times the speed of disk 44, and that gear 43 and gear 42 have a step-up ratio of 1:6 and the ratio of gears 64 and 65 is 1:1, it can be seen that cross shaft 38 and shaft 66 will rotate at equal speed but in opposite direction. Consequently, at this point zero rotation of cage 67 and gear 68 respectively, is obtained. On the other hand by positioning ball 47 at either side of this zero position, a forward or reverse directional rotation of cage 67 is achieved. In a similar manner roller 46 is coupled to a set of gears, gear 72 and gear 73 respectively, and shaft 74 attached to gear 73 constitutes one input to a third differential means. The rotation of cross shaft 38 provides the second input to this third differential means. Again, if ball 48 is at the center position of its radial excursion path along the face of disk 44 and if at this setting roller 46 revolves at six times the speed of disk 44, and further if the gear ratio between gear 72 and gear 73 is 1:1, then the input to the third differential means consisting of shaft 74 and cross shaft 38 will be of equal magnitude but of opposite direction. Consequently, zero speed is obtained on cage 75. Cage 75 connected to gear 76 and engaging gear 77, transmits its rotation to shaft 78 and to the electrical transmitter 79. For the purpose of providing visual means for indicating the rotational movement of the course components, a set of bevel gears 80 and 81 receives motion from shaft 70 which is transmitted by means of shaft 82 and dial 83 fast thereon to the front of the unit. Dial 83 rotates with respect to a stationary mark 84 to provide instant indication of the position of the course component vector. In a similar manner bevel gear 85 attached to shaft 78 drives bevel gear 86 mounted on shaft 87 which terminates in dial 88 attached thereon. Stationary mark 89 provides visual indication of the rotation of dial 88 and shaft 87 respectively.

Having thus provided motion proportional to the speed of the target and having resolved this motion into true course components with proper quadrant notation, it is often desired to apply a rate of turn motion to the course components. Such motion is encountered, for instance, when executing a turn.

The rate of turn motion is produce at the primary variable drive device by means of radially adjustable ball 17, the setting of which is influenced by knob 27 in front of stationary dial 90. The rotary motion of roller 15, by means of a set of gears consisting of gear 91 and 92 respectively, is transmitted to shaft 93 which constitutes one input to a fourth differential means. The second input to this fourth differential means is provided by cross shaft 34. Assuming, for instance, that the ball 17 is at the center of its radial excursion path along the surface of disk 13 and that at this particular point the roller 15 rotates at six times the speed of disk 13, and further that gear 91 and gear 92 have a step-down ratio of 6:1, it can be seen that input shaft 93 and cross shaft 34 rotate at equal speeds but in opposite direction. Consequently, at this particular point zero rotation of cage 94, the output member of the fourth differential, is obtained. By varying the radial position of ball 17 from this mid-position, a forward or a reverse rotation of cage 94 is attained. Gear 95 attached to cage 94 and turning freely on shaft 34 transmits its motion to gear 96 which is coupled to a set of bevel gears, gear 97 and gear 98 respectively. Shaft 99 connected to gear 98 is linked to a disengageable coupling 100. Output coupling shaft 101 has mounted thereon gear 102 connecting to gear 103. Gear 103 by means of shaft 104 transmits motion to gear 50 which is a part of the "Scotch yoke" mechanism. In this manner the rate of turn motion produced at the primary variable speed device and fed through the fourth differential is superimposed upon the "Scotch yoke" mechanism consisting of gears 50 and 53 and associated pins 51 and 54 respectively. Coupling 100 may be disengaged by an outward movement of knob 105 which is attached to clutch shaft 106 and causes link 107 to rotate about the axis of pivot 108. The clutch is thereby disengaged and the rate of turn motion is disconnected from the course resolving means. A detent mechanism (not shown) may be provided for shaft 106 to retain the shaft in its outward position.

When generating the simulated motion of an airborne target it is sometimes desirable to simulate not only the course velocity components but also the motion along a third axis, namely the motion of altitude which must include a rate of ascend or descend. In order to provide for this motion the arrangement surrounding the primary variable speed device shown in Figure 1 and 2 has been modified as depicted schematically in Figure 3.

Constant speed drive motor 10 in Figure 3 has been moved toward the rear in order to accommodate another roller 120 arranged on the backside of disk 13 the rotating input member of the primary drive device. It is obvious that the disk 13 in Figure 3 has its rear face parallel to the front face. Roller 120 is driven frictionally by disk 13 via ball 121 which is retained in an aperture of bar 122. Ball 121 may be located at various positions along the radial axis of disk 13 by means of rack 123 attached to bar 122 and engaging pinion 124, shaft 125 and knob 126 fast thereon. Depending upon the location of ball 121 along its radial excursion path, roller 120 will assume different speeds. The output rotation of roller 120 is transferred to the input shaft 127 of a fifth differential means via a set of gears comprising gear 128 and gear 129. The speed of roller 120 is compared with a constant speed originating at drive motor 10 transmitted to gears 11 and 12, shaft 31, bevel gears 130 and 131 to shaft 132 which constitutes the other input of the fifth differential means. The cage 133 of the fifth differential means has attached thereto a gear 134a meshing with gear 134 which is coupled via shaft 135 to an electrical transmitting means 136 which may be a potentiometer or a synchro for the purpose of converting mechanical shaft rotation to an electrical signal. Assuming that when ball 121 is at the center of its radial excursion along disk 13 and assuming that at this instance roller 120 revolves at six times the speed of disk 13, and if the ratio of gears 129 and 128 is 6 to 1, then at this location of the ball the cage of the fifth differential will stand still. Moving the ball to either direction of this zero point an ascend or a descend rate may be obtained which is effective as rotation of shaft 135. It will be obvious to those skilled in the art that clutching means may be interposed between the fifth differential and the electrical transmitter 136 in order to stop the motion of shaft 135 when proper altitude is reached rather than having to reset ball 121 to a point which results in zero shaft rotation of shaft 135.

In order to accommodate this altitude feature hereinbefore described it is necessary to modify the construction of cross shaft 34 of Figure 1 which transmits the constant input to the first and fourth differential means. In Figure 3 cross shaft 137 has fastened thereon bevel gear 33 and spur gears 138 and 139. In order to provide clearance for gears 128 and 129 an idler shaft 140 is used which is located underneath gears 128 and 129. This idler shaft is equipped on its ends with two gears (not shown) which mesh with gears 139 and 141. Shaft 142 and gear 141 fastened thereon rotate about the same axis as cross shaft 137. In an analogous manner clearance for shaft 31 is provided by means of an idler shaft 143 which also is equipped on its ends with two gears (not shown) and which mesh with gears 138 and 144 respectively, the latter gear being fastened to shaft 145. Shaft 145 is one of the input shafts to the first differential means.

The foregoing mechanism demonstrates that the motion corresponding to the speed of the target is adjustable from a precise zero position to a predetermined value of speed. Furthermore, the primary variable speed device employed for generating a motion related to the speed of the target is also used for generating a motion related to the rate of turn of the target and still further for generating a motion related to the altitude of the target. All three motions originating at the primary speed device are independently and selectively adjustable.

While in the foregoing there has been illustrated and described such combination and arrangements of elements as constitute the preferred embodiment of the invention, it is nevertheless desired to emphasize the fact that various changes in the gear ratios and arrangements of the elements may be made without departing from the spirit of the invention.

What is claimed is:

1. A moving target generating device comprising a constant speed drive; a primary variable drive device generating a first rotating motion associated with the speed of the target and a second rotating motion associated with the rate of turn of the target; a secondary variable drive device generating a course motion; connecting means between said constant speed drive and said primary variable drive device; a first differential means connected to said primary variable drive device and to said constant speed drive for obtaining a modified first motion adjustable between zero and a predetermined value; connecting means connecting said first differential means to said secondary variable drive device; resolving means attached to said secondary variable drive device for resolving rotary motion into two mutually normal vector movements of course; a second differential means connected to said primary variable drive device and to said constant speed drive for obtaining a modified second motion adjustable from a zero setting in a forward and a reverse direction and connecting means from said second differential means to said secondary variable drive device for influencing the setting of said resolving means thereby superimposing a rate of turn motion on the two vector movements of course.

2. A moving target generating device comprising a constant speed drive; a primary variable drive device having a single rotating input member and two selectively adjustable output members generating a rotating motion associated with the speed of the target and a rotating motion associated with the rate of turn of the target respectively; a secondary variable drive device having a single rotating input member and two output members; connecting means connecting said constant speed drive to the input member of said primary variable drive device; a first differential means connected to said primary variable drive device and to said constant speed drive for obtaining a modified target speed motion adjustable from zero to a predetermined value; connecting means connecting said first differential means to the input member of said secondary variable drive device; resolving means attached to said secondary variable drive device for resolving circular motion of its input member into two mutually normal vector movements representing the course vectors of the target; a second and a third differential means connected to the output members of said secondary variable drive device for rendering the course components operable in the four quadrants of a set of Cartesian coordinates; a fourth differential means connected to the rate of turn motion generating output member of said primary variable drive device and to said constant speed drive for obtaining a modified rate of turn motion adjustable from a zero setting in a forward and in a reverse direction and connecting means from said fourth differential means to said resolving means for superimposing a rate of turn motion on the output members of said secondary variable drive device.

3. A moving target generating device comprising a constant speed drive; a primary and a secondary variable drive device each of which having a single rotating input member and a first and a second selectively adjustable rotating output member frictionally driven by said input member; four differential means each having two input shafts and an output shaft wherein the speeds of the two input shafts are combined to give the speed of the output shaft; connecting means connecting said constant speed drive to the input member of said primary variable drive device; one input shaft of a first differential means connected to the first output member of said primary drive device and the other input shaft of said first differential means connected to the input member of said primary drive device; the output shaft of said first differential means defining the speed vector of the target connected to the rotating input member of said secondary variable drive device; resolving means cooperating with the output members of said secondary variable drive device causing both output members to revolve as the two mutually normal vectors of the rotary motion of its input member; one of the input shafts of a second differential means connected to the first output member of the secondary variable drive device; one of the input shafts of a third differential means connected to the second output member of said secondary variable drive device; the other input shafts of said second and third differential means respectively connected to the input member of said secondary variable drive device; the output shafts of the second and the third differential means defining the true rectilinear course components of the target; one input shaft of a fourth differential means connected to the second output member of said primary variable drive device; the other input shaft of said fourth differential means connected to the input member of said primary variable drive device; the output shaft of said fourth differential means rotating adjustable in clockwise or counter-clockwise rotation and defining the rate of turn motion of the target and connecting means including clutch means connecting the output shaft of said fourth differential to the resolving means cooperating with said secondary variable drive device thereby superimposing a rate of turn motion on the rectilinear course components.

4. A moving target generating device comprising a constant speed drive; a primary variable drive device generating several selectively adjustable rotating motions associated with the speed, rate of turn and rate of altitude change of the target respectively; a secondary variable drive device generating a course motion; connecting means between said constant speed drive and said primary variable drive device; a first differential means connected to said primary variable drive device and to said constant speed drive for obtaining a modified speed motion adjustable between zero and a predetermined value; connecting means connecting said first differential means to said secondary variable drive device; resolving means attached to said secondary variable drive device for resolving rotary motion into two mutually normal vector movements of course; a second differential means connected to said primary variable drive device and to said constant speed drive for obtaining a modified rate of turn motion adjustable from a zero setting in a forward and in a reverse direction; connecting means from said second differential means to the resolving means attached to said secondary variable drive device for superimposing a rate of turn motion on the two vector movements of course and a third differential means connected to said primary variable drive device and to said constant speed drive for obtaining a rate of altitude change motion adjustable from a zero setting in a forward and in a reverse direction.

5. A moving target generating device comprising a constant speed drive; a primary variable drive device having a single rotating input member and a first, a second and a third selectively adjustable rotating output member frictionally driven by said input member; a secondary variable drive device having a single rotating input member and a first and a second selectively adjustable rotating output member frictionally driven by said input member; five differential means each having two input shafts and an output shaft wherein the speeds of the two input shafts are combined to give the speed of the output shaft; connecting means connecting said constant speed drive to the input member of said primary variable drive device; one input shaft of a first differential means connected to the first output member of said primary drive device and the other input shaft of said first differential means connected to the input member of said primary drive device; the output shaft of said first differential means defining the speed vector of the target connected to the rotating input member of said secondary variable drive device; resolving means cooperating with the output members of said secondary variable drive device causing both output members to revolve as the two mutually normal vectors of the rotary motion of its input member; one of the input shafts of a second differential means connected to the first output member of the secondary variable drive device; one of the input shafts of a third differential means connected to the second output member of said secondary variable drive device; the other input shafts of said second and third differential means respectively connected to the input member of said secondary variable drive device; the output shafts of the second and the third differential means defining the true rectilinear course components of the target; one input shaft of a fourth differential means connected to the second output member of said primary variable drive device; the other input shaft of said fourth differential means connected to the input member of said primary variable drive device; the output shaft of said fourth differential means rotating adjustably in clockwise or counter-clockwise rotation and defining the rate of turn motion of the target; connecting means including clutch means connecting the output shaft of said fourth differential to the resolving means cooperating with said secondary variable drive device thereby superimposing a rate of turn motion on the rectilinear course components; one input shaft of a fifth differential means connected to the third output member of said primary drive device and the other input shaft of said fifth differential means connected to the input member of said primary drive device and the output shaft of said fifth differential means rotating adjustably in clockwise or counter-clockwise rotation defining the rate of altitude change of the target.

6. A moving target generating device comprising a constant speed drive; a primary variable drive device having a single rotating input member and several selectively adjustable rotating output members frictionally driven by said input member; a secondary variable drive device having a single rotating input member and a plurality of rotating output members frictionally driven by said input member; connecting means connecting said constant speed drive to the input member of said primary variable drive device; several differential means, each being connected to said constant speed drive device and to one of the output members of said primary variable drive device respectively for obtaining modified speeds thereof; the input member of said secondary variable drive device connected to one of said differentials; resolving means including a plurality of differentials attached to said secondary variable drive device for resolving rotary motion into its two mutually normal vector movements and connecting means between one of the differentials associated with one of the output members of said primary variable drive device and said resolving means for superimposing a motion on said resolving means.

ALLAN A. COSTER.

No references cited.